(12) United States Patent
Sinfield et al.

(10) Patent No.: US 10,384,315 B2
(45) Date of Patent: Aug. 20, 2019

(54) HIGH STRENGTH WELDING CONSUMABLE BASED ON A 10% NICKEL STEEL METALLURGICAL SYSTEM

(71) Applicants: CRS Holdings, Inc., Wilmington, DE (US); The United States of America as represented by the Secretary of the Navy, Arlington, VA (US)

(72) Inventors: Matthew Sinfield, Gaithersburg, MD (US); Jeffrey Farren, Cinnaminson, NJ (US); Richard Wong, Germantown, PA (US); William J. Martin, Wyomissing, PA (US); Richard H. Smith, Reading, PA (US); Shane Para, Downingtown, PA (US); James E. Heilmann, West Lawn, PA (US); Paul M. Novotny, Mohnton, PA (US); Patrick C. Ray, Coatesville, PA (US); Dan DeAntonio, Leesport, PA (US); Joe Stravinskas, Lebanon, PA (US)

(73) Assignees: CRS Holdings, Inc., Wilmington, DE (US); The United States Of America, as represented by the Secretary Of The Navy, Arlington, VA (US)

( * ) Notice: Subject to any disclaimer, the term of this patent is extended or adjusted under 35 U.S.C. 154(b) by 257 days.

(21) Appl. No.: 15/292,732

(22) Filed: Oct. 13, 2016

(65) Prior Publication Data

US 2017/0106478 A1    Apr. 20, 2017

Related U.S. Application Data

(60) Provisional application No. 62/241,468, filed on Oct. 14, 2015.

(51) Int. Cl.
| | | |
|---|---|---|
| B23K 35/30 | (2006.01) | |
| B23K 35/02 | (2006.01) | |
| C22C 38/02 | (2006.01) | |
| C22C 38/04 | (2006.01) | |
| C22C 38/08 | (2006.01) | |
| C22C 38/12 | (2006.01) | |
| C22C 38/14 | (2006.01) | |
| C22C 38/44 | (2006.01) | |
| C22C 38/46 | (2006.01) | |
| C22C 38/50 | (2006.01) | |
| C21D 9/50 | (2006.01) | |
| C21D 9/52 | (2006.01) | |

(52) U.S. Cl.
CPC ...... *B23K 35/3066* (2013.01); *B23K 35/0255* (2013.01); *C22C 38/02* (2013.01); *C22C 38/04* (2013.01); *C22C 38/08* (2013.01); *C22C 38/12* (2013.01); *C22C 38/14* (2013.01); *C22C 38/44* (2013.01); *C22C 38/46* (2013.01); *C22C 38/50* (2013.01)

(58) Field of Classification Search
None
See application file for complete search history.

(56) References Cited

U.S. PATENT DOCUMENTS

| | | | |
|---|---|---|---|
| 3,656,918 A * | 4/1972 | De Long | B23K 35/3066 428/683 |
| 3,902,039 A * | 8/1975 | Lang | B23K 35/3066 219/146.1 |
| 4,436,554 A | 3/1984 | Omae et al. | |
| 7,425,229 B2 | 9/2008 | Frankel et al. | |
| 7,696,453 B2 | 4/2010 | Frankel et al. | |
| 7,743,967 B2 | 6/2010 | Frankel et al. | |
| 9,314,880 B2 | 4/2016 | Wallin et al. | |
| 2013/0078031 A1 | 3/2013 | Nahamura et al. | |

FOREIGN PATENT DOCUMENTS

| | | | |
|---|---|---|---|
| JP | 5476452 | | 6/1979 |
| JP | 5717598 A | | 10/1982 |
| JP | 2007/119811 A | * | 5/2007 |
| JP | 201156539 | | 3/2011 |
| WO | 2007049367 A1 | | 5/2007 |

OTHER PUBLICATIONS

English translation of JP 2007/119811, May 2007; 29 pages.*
European Patent Office Communication, dated Feb. 16, 2018, 12 pages.
European Search Report, dated Feb. 13, 2017, 13 pages.

* cited by examiner

*Primary Examiner* — Helene Klemanski
(74) *Attorney, Agent, or Firm* — Barley Snyder; Howard Kaiser, Esquire

(57) ABSTRACT

An exemplary welding consumable according to the invention is provided and includes up to about 0.13 wt % carbon, about 0.3 wt % to about 1.4 wt % manganese, about 7.25 wt % to about 11.5 wt % nickel, about 0.6 wt % to about 1.2 wt % molybdenum, about 0.2 wt % to about 0.7 wt % silicon, up to about 0.3 wt % vanadium, up to about 0.05 wt % titanium, up to about 0.08 wt % zirconium, up to about 2.0 wt % chromium, and a balance of iron and incidental impurities.

61 Claims, No Drawings

HIGH STRENGTH WELDING CONSUMABLE BASED ON A 10% NICKEL STEEL METALLURGICAL SYSTEM

CROSS-REFERENCE TO RELATED APPLICATION

This application claims priority under 35 U.S.C. § 119 to U.S. Provisional Patent Application No. 62/241,468 filed Oct. 14, 2015.

FIELD OF THE INVENTION

The invention generally relates to a high strength welding consumable and, more specifically, to a high strength and good toughness welding consumable based on a martensitic 10% nickel steel metallurgical system.

BACKGROUND

Historically, it has been extremely difficult to achieve both high strength and good toughness in steel welds with yield strengths (YS) above 100 ksi in matching strength alloys, such as HSLA-100/115 and HY-100/130. High strength is attainable, but often not in conjunction with consistently good toughness over a range of welding conditions, cooling rates, and service temperatures. Generally, high strength steel welding consumables produce weld deposits that exhibit an inverse relationship between YS and impact toughness, and tend to be sensitive to cooling rate. For example, MIL-120S and MIL-140S solid wire consumables produce welds that display the inverse relationship between YS and impact toughness.

High nickel steel welding consumables, generally defined as steel consumables having between 3-12 wt. % Ni, have been investigated by researchers since the 1960s as a way to achieve both high strength (>100 ksi YS) and good toughness. While the previous work in this area has been promising, a robust, commercially available, high strength, good toughness welding consumable still does not exist in today's market that meets many commercial and military application requirements.

Consequently, there is a need for a matching strength solid wire welding consumable for high strength steels (YS of 100 ksi and greater) that produces a weld deposit with stable mechanical property performance when used in a variety of welding conditions which produce good toughness across a range of cooling rates, and when exposed to low service temperatures.

SUMMARY

An exemplary welding consumable according to the invention is provided. The exemplary welding consumable includes a composition comprising, up to about 0.13 wt % carbon, about 0.3 wt % to about 1.4 wt % manganese, about 7.25 wt % to about 11.5 wt % nickel, about 0.6 wt % to about 1.2 wt % molybdenum, about 0.2 wt % to about 0.7 wt % silicon, up to about 0.3 wt % vanadium, up to about 0.05 wt % titanium, up to about 0.08 wt % zirconium, up to about 2.0 wt % chromium, and a balance of iron and incidental impurities.

DETAILED DESCRIPTION OF EXEMPLARY EMBODIMENTS

In accordance with exemplary practice of the present invention, a welding consumable composition according to the invention is provided for use in welding high strength steel to produce a weld deposit having matching high strength and good toughness over a range of service temperatures. The exemplary composition provides a robust welding consumable that can be used in a variety of welding conditions which produce different cooling rates. Those of ordinary skill in art would appreciate that the welding consumable composition can be used in a variety of welding processes including gas tungsten arc welding (GTAW), gas metal arc welding (GMAW), and other common fusion metal deposition processes, such as additive manufacturing.

Table 1 shows an exemplary embodiment of the welding consumable composition.

TABLE 1

Exemplary Welding Consumable Composition

| Element | wt. % |
| --- | --- |
| Carbon (C) | 0.0-0.13 |
| Manganese (Mn) | 0.3-1.4 |
| Nickel (Ni) | 7.25-11.5 |
| Molybdenum (Mo) | 0.6-1.2 |
| Silicon (Si) | 0.2-0.7 |
| Vanadium (V) | 0-0.3 |
| Titanium (Ti) | 0-0.05 |
| Zirconium (Zr) | 0-0.08 |
| Phosphorus (P) plus Sulfur (S) | 0-0.030 |
| Chromium (Cr) | 0-2.0 |
| Rare Earth Elements | 0.0-0.5 |
| Iron (Fe) | Balance |

In an exemplary embodiment, the welding consumable composition includes up to about 0.13 wt % carbon. The carbon contributes to the high strength of the composition through interstitial hardening and by promoting the formation of carbides. The carbides may also contribute to grain refinement by pinning grain boundaries, thus reducing the prior austenite grain size. In an exemplary embodiment, the welding consumable composition includes about 0.02 to about 0.06 wt % carbon.

In an exemplary embodiment, the welding consumable composition includes about 0.3 to about 1.4 wt % manganese. Manganese contributes to increasing the hardness, strength and toughness of the composition, and may also inhibit intergranular segregation of sulfur, as well as providing beneficial molten weld pool deoxidizing effects. In an exemplary embodiment, the welding consumable composition includes about 0.6 to about 0.8 wt % manganese.

In an exemplary embodiment, the welding consumable composition includes about 7.25 to about 11.5 wt % nickel. The nickel increases the toughness of the composition over a wide range of temperatures. The relatively high Ni may also be contributing to the shallow impact energy (toughness) verses temperature behavior by relatively lowering the alloy's ductile to brittle transition temperature and the upper shelf impact energy. In an exemplary embodiment, the welding consumable composition includes about 9.0 to about 10.0 wt % nickel.

In an exemplary embodiment, the welding consumable composition includes about 0.6 to about 1.2 wt % molybdenum. The molybdenum is a carbide former that increases the high strength and toughness of the composition by promoting the formation of carbides that help provide grain refinement. Grain refinement is achieved through a reduction in prior-austenite grain diameter. Molybdenum further contributes towards an increase in the temper resistance and secondary hardening of the composition in the weld deposit. In an exemplary embodiment, the welding consumable composition includes about 0.8 to about 0.9 wt % molybdenum.

In an exemplary embodiment, the welding composition includes about 0.2 to about 0.7 wt % silicon. The silicon serves to deoxidize the composition when the composition is melted during the welding process, and thereby contributes to increasing the strength and toughness of the composition.

In an exemplary embodiment, the welding consumable composition includes about 0 to about 0.3 wt % vanadium. The vanadium is a carbide former that contributes to the high strength and toughness of the composition by promoting the formation of carbides that provide grain refinement. The vanadium also provides temper resistance and secondary hardening of the composition in the weld deposit.

In an exemplary embodiment, the welding consumable composition includes about 0 to about 0.05 wt % titanium. The titanium is included to promote the refinement of the austenitic grain size.

In an exemplary embodiment, the welding consumable composition includes about 0 to about 0.08 wt % zirconium. The zirconium is an oxide former that increases the toughness of the composition through promoting the formation of an increased population of small oxide that act as initiation sites for microvoid coalescences, as well as providing deoxidizing effects. Furthermore, the zirconium-containing oxides provide strong hydrogen traps in weld metal, thus restricting the amount of available hydrogen for delayed cracking. In another embodiment, the welding consumable composition includes about 0.01 to about 0.05 wt % zirconium.

In an exemplary embodiment, the welding consumable composition includes about 0 to about 2.0 wt % chromium. Chromium additions promote the formation of carbides that provide grain refinement. In an exemplary embodiment, the welding consumable composition includes about 0 to about 0.3 wt % chromium.

In an exemplary embodiment, the welding consumable composition may include about 0 to about 0.5 wt % of a rare earth element addition. The rare earth element addition may include cerium (Ce), lanthanum (La), yttrium (Y), or another rare earth element, including dysprosium (Dy), erbium (Er), europium (Eu), gadolinium (Gd), holmium (Ho), lutetium (Lu), neodymium (Nd), praseodymium (Pr), promethium (Pm), samarium (Sm), scandium (Sc), terbium (Tb), thulium (Tm), and ytterbium (Yb). The rare earth element addition may also include a combination of multiple rare earth elements. Rare earth additions are used to promote a stable welding arc and may allow the welding consumable to be used with shielding gases that contain lower amounts of active gases such as oxygen.

In an exemplary embodiment, the balance of the welding consumable composition is essentially iron.

In an exemplary embodiment, the welding consumable composition may also include impurities commonly known to those of ordinary skill in the art. For example, these impurities may include up to 0.030 wt % phosphorus plus sulphur, up to 0.05 wt % aluminum, up to 0.05 wt % copper, up to 0.20 wt % niobium, up to 0.25 wt % cobalt, or a combination thereof. In some embodiments, there is up to about 0.01 wt % phosphorus and up to about 0.003 wt % sulfur. One of ordinary skill in the art would also appreciate that other impurities may also be present in trace amounts, for example, oxygen, nitrogen, and hydrogen.

An exemplary method of manufacturing a welding consumable composition according to the invention will be discussed.

While no special melting techniques are needed to make an exemplary welding consumable composition, the composition can be vacuum induction melted (VIM) and, when desired for critical applications, refined using vacuum arc remelting (VAR). Furthermore, the composition can also be arc melted in air. After air melting, the composition can be refined by electroslag remelting (ESR) or VAR. The composition can be hot worked from a temperature of about 2100° F. to form various intermediate product forms such as billets or bars. The composition can be heat treated by austenitizing at about 1585° F. to about 1735° F. for about 1-2 hours. The composition can then cooled at a rate equivalent to air cooling or faster.

EXAMPLES

In the following examples, the novel combination of high strength and good toughness provided by an alloy having the above described welding consumable composition was demonstrated by test results on nine embodiments in the form of 400 lbs heats. Each of the nine heats were cast into 7.5" sq. ingots, which were worked, through a hot forging process and a hot rolling process, into a welding wire of approximately 0.045-in. diameter. Table 2 provides the approximate chemistries of the wire made from the nine heats.

TABLE 2

| Composition of eight tested embodiments in % wt | | | | | | | | | | |
|---|---|---|---|---|---|---|---|---|---|---|
| Heat # | C | Cr | Mn | Ni | Mo | Si | Ti | V | Zr | Fe |
| 011332 | 0.068 | <0.01 | 0.34 | 7.46 | 0.86 | 0.38 | 0.01 | 0.15 | <0.01 | balance |
| 011333 | 0.067 | <0.01 | 0.63 | 9.42 | 0.85 | 0.40 | 0.01 | 0.15 | 0.01 | balance |
| 011334 | 0.100 | <0.01 | 0.39 | 9.48 | 1.15 | 0.40 | 0.01 | 0.15 | 0.01 | balance |
| 011335 | 0.105 | <0.01 | 0.68 | 7.43 | 1.14 | 0.39 | 0.01 | 0.15 | 0.01 | balance |
| 011336 | 0.066 | <0.01 | 0.39 | 7.43 | 1.15 | 0.38 | 0.02 | 0.15 | 0.01 | balance |
| 011337 | 0.065 | <0.01 | 0.65 | 9.54 | 1.16 | 0.40 | 0.01 | 0.15 | 0.01 | balance |
| 011338 | 0.095 | <0.01 | 0.40 | 9.44 | 0.85 | 0.39 | 0.01 | 0.15 | 0.01 | balance |
| 011339 | 0.096 | <0.01 | 0.62 | 7.50 | 0.85 | 0.39 | 0.01 | 0.15 | 0.01 | balance |
| 011178 | 0.080 | Not tested | Not tested | 9.94 | 1.05 | 0.39 | 0.01 | 0.15 | Not tested | balance |

For these embodiments, the wire was bare without arc stabilizing lubricant, feed aid, or Cu coating, although those of ordinary skill in the art would appreciate that such additional elements could be used. Eight test welds using the welding wires were made in ¾ in. thick HY-130 steel plate with a ¼ in. thick HY-130 backing in single a vee-groove weld joint comprised of a 45° included angle and ½ in. root opening to minimize base metal dilution in the deposited weld metal. Welds were preheated to 250° F. and fabricated in the flat position using a mechanized, spray metal transfer gas metal arc welding (GMAW-S) process, with a shielding gas mixture of 98% Ar/2% O. Welding interpass temperature was maintained between 250-275° F. to minimize detrimental effects due to hydrogen. A nominal welding heat input of 40 kJ/in was used for all eight test welds. Table 3 shows the weld metal deposit chemistry of the eight 400 lbs heats.

TABLE 3

GMAW Spray all weld metal deposition sample compositions in % wt

| Weldment # | Heat # | C | Cr | Mn | Ni | Mo | Si | Ti | V | Zr | Fe |
|---|---|---|---|---|---|---|---|---|---|---|---|
| 1 | 011332 | 0.067 | 0.01 | 0.36 | 7.39 | 0.86 | 0.35 | 0.01 | 0.14 | 0.01 | balance |
| 2 | 011333 | 0.063 | <0.01 | 0.58 | 9.31 | 0.86 | 0.33 | 0.01 | 0.14 | 0.01 | balance |
| 3 | 011334 | 0.096 | <0.01 | 0.35 | 9.42 | 1.16 | 0.35 | 0.01 | 0.14 | 0.01 | balance |
| 4 | 011335 | 0.100 | <0.01 | 0.6 | 7.42 | 1.16 | 0.34 | 0.01 | 0.14 | 0.01 | balance |
| 5 | 011336 | 0.069 | 0.01 | 0.37 | 7.39 | 1.15 | 0.36 | 0.02 | 0.15 | <0.01 | balance |
| 6 | 011337 | 0.063 | <0.01 | 0.6 | 9.43 | 1.15 | 0.34 | 0.01 | 0.14 | 0.01 | balance |
| 7 | 011338 | 0.094 | 0.02 | 0.36 | 9.24 | 0.84 | 0.34 | 0.01 | 0.14 | <0.01 | balance |
| 8 | 011339 | 0.094 | 0.01 | 0.6 | 7.42 | 0.85 | 0.33 | 0.01 | 0.14 | <0.01 | balance |

Table 4A shows the Charpy V-notch impact energy (CVN IE) in foot-lbs (ft-lbs) at 0° F. for the eight welds described in Table 3. Table 4B shows the Charpy V-notch impact energy (CVN IE) in foot-lbs (ft-lbs) at −60° F. for the eight heats described in Table 3. The test pieces in both Table 4A and 4B were 0.394" square. A V-shaped notch with a depth of 0.079" as formed in the middle of the test piece, with a notch radius of 0.010". The test piece was then subjected to a Charpy test in accordance with ASTM E23 and AWS B4.0:2007.

TABLE 4A

GMAW Spray Charpy V-notch Impact Energy (ft-lbs) at 0° F.

| Weld # | Heat # | Test Temp (° F.) | Impact 1 | Impact 2 | Impact 3 | Impact 4 | Impact 5 | Average |
|---|---|---|---|---|---|---|---|---|
| 1 | 011332 | 0 | 38.4 | 37.2 | 39.2 | 41 | 41.6 | 39.48 |
| 2 | 011333 | 0 | 39.9 | 44.8 | 42.8 | 40 | 40 | 41.5 |
| 3 | 011334 | 0 | 25.4 | 26.5 | 29 | 27.6 | 27.9 | 27.28 |
| 4 | 011335 | 0 | 32.2 | 37.2 | 32.6 | 32.5 | 35.4 | 33.98 |
| 5 | 011336 | 0 | 35.2 | 30.8 | 38.3 | 36.8 | 35.9 | 35.4 |
| 6 | 011337 | 0 | 29.9 | 26.1 | 33.2 | 30.3 | 32.8 | 30.46 |
| 7 | 011338 | 0 | 27.3 | 29.6 | 25.8 | 27.6 | 31.2 | 28.3 |
| 8 | 011339 | 0 | 34.2 | 32.6 | 34.9 | 32.4 | 35.1 | 33.84 |

TABLE 4B

GMAW Spray Charpy V-notch Impact Energy (ft-lbs) at −60° F.

| Weld # | Heat # | Test Temp (° F.) | Impact 1 | Impact 2 | Impact 3 | Impact 4 | Impact 5 | Average |
|---|---|---|---|---|---|---|---|---|
| 1 | 011332 | −60 | 22.9 | 21.8 | 23 | 32.1 | 29.8 | 25.92 |
| 2 | 011333 | −60 | 36.5 | 39.3 | 33.6 | 40.7 | 38.3 | 37.68 |
| 3 | 011334 | −60 | 26.7 | 28.5 | 29.3 | 25.8 | 23.9 | 26.84 |
| 4 | 011335 | −60 | 25.2 | 23.9 | 25.8 | 28.3 | 22.8 | 25.2 |
| 5 | 011336 | −60 | 31.6 | 27 | 29.9 | 27.8 | 26.3 | 28.52 |
| 6 | 011337 | −60 | 30.6 | 37.6 | 27.3 | 27.3 | 26.4 | 29.84 |
| 7 | 011338 | −60 | 29.6 | 26.6 | 25.8 | 27.6 | 25.6 | 27.04 |
| 8 | 011339 | −60 | 28.6 | 29.9 | 29 | 30.2 | 29.3 | 29.4 |

Table 5 shows the room temperature mechanical testing for the eight welds described in Table 3, including the 0.2% offset yield strength (YS) in ksi, the ultimate tensile strength (UTS) in ksi, the percent elongation (% EL), and the percent reduction in area (% RA). The test pieces were 0.500" or 0.350" gauge diameter and were conducted in accordance with ASTM E8 and AWS B4.0:2007.

TABLE 5

GMAW Spray All Weld Metal Room Temperature Mechanical Testing

| Weld/Test # | Heat # | Test Temp | Y.S. (ksi) | U.T.S. (ksi) | % E.L. | % R.A. |
|---|---|---|---|---|---|---|
| 1a | 011332 | RT | 143 | 155 | 16 | 54 |
| 1b | | | 141 | 154 | 15 | 50 |
| Avg. | | | 142 | 154.5 | 15.5 | 52 |
| 2a | 011333 | RT | 140 | 162 | 17 | 56 |
| 2b | | | 140 | 163 | 18 | 52 |
| Avg. | | | 140 | 162.5 | 17.5 | 54 |
| 3a | 011334 | RT | 146 | 172 | 17 | 54 |
| 3b | | | 145 | 171 | 16 | 48 |
| Avg. | | | 145.5 | 171.5 | 16.5 | 51 |
| 4a | 011335 | RT | 146 | 169 | 16 | 49 |
| 4b | | | 145 | 166 | 16 | 46 |
| Avg. | | | 145.5 | 167.5 | 16 | 47.5 |

TABLE 5-continued

GMAW Spray All Weld Metal Room Temperature Mechanical Testing

| Weld/Test # | Heat # | Test Temp | Y.S. (ksi) | U.T.S. (ksi) | % E.L. | % R.A. |
|---|---|---|---|---|---|---|
| 5a | 011336 | RT | 144 | 156 | 15 | 43 |
| 5b | | | 143 | 157 | 17 | 53 |
| Avg. | | | 143.5 | 156.5 | 16 | 48 |
| 6a | 011337 | RT | 138 | 163 | 16 | 48 |
| 6b | | | 139 | 163 | 16 | 45 |
| Avg. | | | 138.5 | 163 | 16 | 46.5 |
| 7a | 011338 | RT | 150 | 169 | 17 | 42 |
| 7b | | | 146 | 169 | 15 | 41 |
| Avg. | | | 148 | 169 | 16 | 41.5 |
| 8a | 011339 | RT | 151 | 163 | 14 | 37 |
| 8b | | | 150 | 162 | 15 | 41 |
| Avg. | | | 150.5 | 162.5 | 14.5 | 39 |

To demonstrate the consumable's versatility when deposited via other traditional GMAW process variants, a low heat input GMAW pulse weld was fabricated using wire from Heat 011333. The test weld was made using ¾ in. thick HY-100 steel plate with a ¼ in. thick HY-100 backing in single a vee-groove weld joint comprised of a 45° included angle and ½ in. root opening to minimize base metal dilution in the deposited weld metal. Welds were preheated to 250° F. and fabricated in the flat position using a mechanized process with a shielding gas mixture of 98% Ar/2% O. Welding interpass temperature was maintained between 250-275° F. to minimize detrimental effects due to hydrogen. A nominal welding heat input of 19 kJ/in was used. Table 6 shows the weld metal deposit chemistry of the Weld 9 GMAW pulse test weld.

TABLE 6

GMAW pulse weld metal deposition sample compositions in % wt

| Weld # | Heat # | C | Cr | Mn | Ni | Mo | Si | Ti | V | Zr | Fe |
|---|---|---|---|---|---|---|---|---|---|---|---|
| 9 | 011333 | 0.057 | 0.03 | 0.64 | 9.23 | 0.84 | 0.36 | 0.01 | 0.14 | 0.01 | balance |

Table 7A shows the Charpy V-notch impact energy (CVN IE) in foot-lbs (ft-lbs) at 0° F. for the test weld described in Table 6. Table 7B shows the Charpy V-notch impact energy (CVN IE) in foot-lbs (ft-lbs) at −60° F. for the test weld described in Table 6. Table 7C shows the Charpy V-notch impact energy (CVN IE) in foot-lbs (ft-lbs) at −150° F. for the test weld described in Table 6. Table 7D shows the Charpy V-notch impact energy (CVN IE) in foot-lbs (ft-lbs) at −230° F. for the test weld described in Table 6. Table 7E shows the Charpy V-notch impact energy (CVN IE) in foot-lbs (ft-lbs) at −314° F. for the test weld described in Table 6. The test pieces in Tables 7A-E were 0.394" square. A V-shaped notch with a depth of 0.079" as formed in the middle of the test piece, with a notch radius of 0.010". The test piece was then subjected to a Charpy test in accordance with ASTM E23 and AWS B4.0:2007.

TABLE 7A

GMAW Pulse Charpy V-notch Impact Energy (ft-lbs) at 0° F.

| Weld # | Heat # | Test Temp (° F.) | Impact 1 | Impact 2 | Impact 3 | Average |
|---|---|---|---|---|---|---|
| 9 | 011333 | 0 | 47.9 | 52.5 | 49.3 | 49.9 |

TABLE 7B

GMAW Pulse Charpy V-notch Impact Energy (ft-lbs) at −60° F.

| Weld # | Heat # | Test Temp (° F.) | Impact 1 | Impact 2 | Impact 3 | Average |
|---|---|---|---|---|---|---|
| 9 | 011333 | −60 | 45.7 | 42.5 | 45.5 | 44.6 |

TABLE 7C

GMAW Pulse Charpy V-notch Impact Energy (ft-lbs) at −150° F.

| Weld # | Heat # | Test Temp (° F.) | Impact 1 | Impact 2 | Impact 3 | Average |
|---|---|---|---|---|---|---|
| 9 | 011333 | −150 | 40 | 42 | 35 | 39 |

TABLE 7D

GMAW Pulse Charpy V-notch Impact Energy (ft-lbs) at −230° F.

| Weld # | Heat # | Test Temp (° F.) | Impact 1 | Impact 2 | Impact 3 | Average |
|---|---|---|---|---|---|---|
| 9 | 011333 | −230 | 23 | 26 | 24 | 24.3 |

TABLE 7E

GMAW Pulse Charpy V-notch Impact Energy (ft-lbs) at −314° F.

| Weld # | Heat # | Test Temp (° F.) | Impact 1 | Impact 2 | Impact 3 | Average |
|---|---|---|---|---|---|---|
| 9 | 011333 | −314 | 10 | 12 | 10 | 10.7 |

Table 8 shows the room temperature all weld metal mechanical testing for the test weld described in Table 6, including the 0.2% offset yield strength (YS) in ksi, the ultimate tensile strength (UTS) in ksi, the percent elongation (% EL), and the percent reduction in area (% RA). The test pieces were 0.500" or 0.350" gauge diameter and were conducted in accordance with ASTM E8 and AWS B4.0: 2007.

TABLE 8

GMAW Pulse All Weld Metal Room Temperature Mechanical Testing

| Weld # | Heat # | Test Temp | Y.S. (ksi) | U.T.S. (ksi) | % E.L. | % R.A. |
|---|---|---|---|---|---|---|
| 9a | 011333 | RT | 145 | 157 | 18 | 62 |
| 9b |  |  | 145 | 157 | 19 | 61 |
| Avg. |  |  | 145 | 157 | 18.5 | 61.5 |

Additionally, to demonstrate the wire's suitability for other arc welding processes, test welds were fabricated via the GTAW process from heat 011178. Two gas tungsten arc welds were made using ¾ in. thick HY-130 steel plate with a ¼ in. thick HY-130 backing in single a vee-groove weld joint comprised of a 45° included angle and ½ in. root opening to minimize base metal dilution in the deposited weld metal. Welds were preheated to 250° F. and fabricated in the flat position using a semi-automated cold wire feed, mechanized process with a shielding gas of 100% Ar. Welding interpass temperature was maintained between 250-275° F. to minimize detrimental effects due to hydrogen. A nominal heat input of 46 kJ/in. was used to fabricate all three gas tungsten arc welds. Table 9 shows the weld metal deposit chemistry of the gas tungsten arc test welds.

TABLE 9

GTAW weld metal deposition sample compositions in % wt

| Weld # | Heat # | C | Cr | Mn | Ni | Mo | Si | Ti | V | Zr | Fe |
|---|---|---|---|---|---|---|---|---|---|---|---|
| 10 | 011178 | 0.075 | 0.052 | 0.57 | 10.10 | 1.01 | 0.40 | 0.009 | 0.15 | 0.003 | balance |
| 11 | 011178 | 0.069 | 0.03 | 0.60 | 9.70 | 1.03 | 0.39 | 0.02 | 0.14 | <0.01 | balance |

Table 10A shows the Charpy V-notch impact energy (CVN IE) in foot-lbs (ft-lbs) at 0° F. for the test welds described in Table 9. Table 10B shows the Charpy V-notch impact energy (CVN IE) in foot-lbs (ft-lbs) at −60° F. for the test welds described in Table 9. Table 10C shows the Charpy V-notch impact energy (CVN IE) in foot-lbs (ft-lbs) at −150° F. for Weld 11 described in Table 9. Table 10D shows the Charpy V-notch impact energy (CVN IE) in foot-lbs (ft-lbs) at −230° F. for Weld 11 described in Table 9. Table 10E shows the Charpy V-notch impact energy (CVN IE) in foot-lbs (ft-lbs) at −314° F. for Weld 11 described in Table 9. The test pieces in Tables 10A-E were 0.394" square. A V-shaped notch with a depth of 0.079" as formed in the middle of the test piece, with a notch radius of 0.010". The test piece was then subjected to a Charpy test in accordance with ASTM E23 and AWS B4.0:2007.

TABLE 10A

GTAW Charpy V-notch Impact Energy (ft-lbs) at 0° F.

| Weld # | Heat # | Test Temp (° F.) | Impact 1 | Impact 2 | Impact 3 | Average |
|---|---|---|---|---|---|---|
| 10 | 011178 | 0 | 150 | 158 | 152 | 153 |
| 11 | 011178 | 0 | 148 | 168 | 187 | 168 |

TABLE 10B

GTAW Charpy V-notch Impact Energy (ft-lbs) at −60° F.

| Weld # | Heat # | Test Temp (° F.) | Impact 1 | Impact 2 | Impact 3 | Average |
|---|---|---|---|---|---|---|
| 10 | 011178 | −60 | 140 | 155 | 149 | 148 |
| 11 | 011178 | −60 | 155 | 175 | 164 | 165 |

TABLE 10C

GTAW Charpy V-notch Impact Energy (ft-lbs) at −150° F.

| Weld # | Heat # | Test Temp (° F.) | Impact 1 | Impact 2 | Average |
|---|---|---|---|---|---|
| 11 | 011178 | −150 | 143 | 150 | 146.5 |

TABLE 10D

GTAW Charpy V-notch Impact Energy (ft-lbs) at −230° F.

| Weld # | Heat # | Test Temp (° F.) | Impact 1 | Impact 2 | Average |
|---|---|---|---|---|---|
| 11 | 011178 | −230 | 124 | 119 | 121.5 |

TABLE 10E

GTAW Charpy V-notch Impact Energy (ft-lbs) at −314° F.

| Weld # | Heat # | Test Temp (° F.) | Impact 1 | Impact 2 | Impact 3 | Average |
|---|---|---|---|---|---|---|
| 11 | 011178 | −314 | 48 | 61 | 48 | 52.3 |

Table 11 shows the room temperature all weld metal mechanical testing for the test weld described in Table 9, including the 0.2% offset yield strength (YS) in ksi, the ultimate tensile strength (UTS) in ksi, the percent elongation (% EL), and the percent reduction in area (% RA). The test pieces were 0.500" or 0.350" gauge diameter and were conducted in accordance with ASTM E8 and AWS B4.0:2007.

TABLE 11

GTAW All Weld Metal Room Temperature Mechanical Testing

| Heat # | Test Temp | Y.S. (ksi) | U.T.S. (ksi) | % E.L. | % R.A. |
|---|---|---|---|---|---|
| 10 | RT | 156 | 183 | 21 | 63 |
| 11 | RT | 160 | 179 | 21 | 72 |

While the invention has been described in detail and with reference to specific embodiments, one of ordinary skill in the art would appreciate that the described embodiments are illustrative, and that various changes and modifications can be made without departing from the scope of the invention.

What is claimed is:

1. A welding consumable composition comprising:
up to about 0.13 wt % carbon,
about 0.3 wt % to about 1.4 wt % manganese,
about 7.25 wt % to about 11.5 wt % nickel,
about 0.6 wt % to about 1.2 wt % molybdenum,
about 0.2 wt % to about 0.7 wt % silicon,
up to about 0.3 wt % vanadium,
up to about 0.05 wt % titanium,
up to about 0.08 wt % zirconium,
up to about 2.0 wt % chromium,
about 0.0 to about 0.5 wt % of a rare earth element, and
a balance of iron and incidental impurities.

2. The welding consumable composition of claim 1, wherein the carbon content is about 0.02 to about 0.06 wt %.

3. The welding consumable composition of claim 1, wherein the manganese content is about 0.6 to about 0.8 wt %.

4. The welding consumable composition of claim 1, wherein the nickel content is about 9.0 to about 10.0 wt %.

5. The welding consumable composition of claim 1, wherein the molybdenum content is about 0.8 to about 0.9 wt %.

6. The welding consumable composition of claim 1, wherein the zirconium content is about 0.01 to about 0.05 wt %.

7. The welding consumable composition of claim 1, further comprising about 0 to about 0.030 wt % phosphorus plus sulfur.

8. The welding consumable composition of claim 7, further comprising up to about 0.01 wt % phosphorus.

9. The welding consumable composition of claim 8, further comprising up to about 0.003 wt % sulfur.

10. The welding consumable composition of claim 7, further comprising up to about 0.3 wt % chromium.

11. The welding consumable composition of claim 7, further comprising up to about 0.01 wt % aluminum.

12. The welding consumable composition of claim 7, further comprising up to about 0.01 wt % copper.

13. The welding consumable composition of claim 7, further comprising up to about 0.05 wt % niobium.

14. The welding consumable composition of claim 7, further comprising up to about 0.01 wt % cobalt.

15. The welding consumable composition of claim 1, wherein the rare earth element includes cerium, lanthanum, or yttrium.

16. A welding consumable comprising:
an alloy having about 7.25 wt % to about 11.5 wt % nickel, and
about 0.0 to about 0.5 wt % of a rare earth element, producing a weldment having a yield strength greater than or equal to 100 ksi.

17. The welding consumable of claim 16, wherein the yield strength is greater than or equal to 120 ksi.

18. The welding consumable of claim 17, wherein the yield strength is greater than or equal to 130 ksi.

19. The welding consumable of claim 18, wherein the yield strength is greater than or equal to 140 ksi.

20. The welding consumable of claim 19, wherein the yield strength is greater than or equal to 150 ksi.

21. The welding consumable of claim 20, wherein the alloy has a Charpy V-notch impact energy at −60° F. greater than or equal to 20 ft-lbs.

22. The welding consumable of claim 21, wherein the Charpy V-notch impact energy at −60° F. greater than or equal to 30 ft-lbs.

23. The welding consumable of claim 22, wherein the Charpy V-notch impact energy at −60° F. greater than or equal to 40 ft-lbs.

24. The welding consumable of claim 16, wherein the alloy further comprises:
up to about 0.13 wt % carbon,
about 0.3 wt % to about 1.4 wt % manganese,
about 7.25 wt % to about 11.5 wt % nickel,
about 0.6 wt % to about 1.2 wt % molybdenum,
about 0.2 wt % to about 0.7 wt % silicon,
up to about 0.3 wt % vanadium,
up to about 0.05 wt % titanium,
up to about 0.08 wt % zirconium,
up to about 2.0 wt % chromium, and
a balance of iron and incidental impurities.

25. The welding consumable of claim 24, wherein the carbon content is about 0.02 to about 0.06 wt %.

26. The welding consumable of claim 24, wherein the manganese content is about 0.6 to about 0.8 wt %.

27. The welding consumable of claim 24, wherein the nickel content is about 9.0 to about 10.0 wt %.

28. The welding consumable of claim 24, wherein the molybdenum content is about 0.8 to about 0.9 wt %.

29. The welding consumable of claim 28, wherein the zirconium content is about 0.01 to about 0.05 wt %.

30. The welding consumable of claim 29, further comprising about 0 to about 0.030 wt % phosphorus plus sulfur.

31. The welding consumable of claim 16, wherein the rare earth element includes cerium, lanthanum, or yttrium.

32. A welding consumable composition comprising:
up to about 0.13 wt % carbon,
about 0.3 wt % to about 1.4 wt % manganese,
about 7.25 wt % to about 11.5 wt % nickel,
about 0.6 wt % to about 1.2 wt % molybdenum,
about 0.2 wt % to about 0.7 wt % silicon,
about 0 to about 0.030 wt % phosphorus plus sulfur,
up to about 0.01 wt % cobalt,
up to about 0.3 wt % vanadium,
up to about 0.05 wt % titanium,
up to about 0.08 wt % zirconium,
up to about 2.0 wt % chromium, and
a balance of iron and incidental impurities.

33. The welding consumable composition of claim 32, wherein the carbon content is about 0.02 to about 0.06 wt %.

34. The welding consumable composition of claim 32, wherein the manganese content is about 0.6 to about 0.8 wt %.

35. The welding consumable composition of claim 32, wherein the nickel content is about 9.0 to about 10.0 wt %.

36. The welding consumable composition of claim 32, wherein the molybdenum content is about 0.8 to about 0.9 wt %.

37. The welding consumable composition of claim 32, wherein the zirconium content is about 0.01 to about 0.05 wt %.

38. The welding consumable composition of claim 32, further comprising up to about 0.01 wt % phosphorus.

39. The welding consumable composition of claim 32, further comprising up to about 0.003 wt % sulfur.

40. The welding consumable composition of claim 32, further comprising up to about 0.3 wt % chromium.

41. The welding consumable composition of claim 32, further comprising up to about 0.01 wt % aluminum.

42. The welding consumable composition of claim 32, further comprising up to about 0.01 wt % copper.

43. The welding consumable composition of claim 32, further comprising up to about 0.05 wt % niobium.

44. The welding consumable composition of claim 32, further comprising about 0.0 to about 0.5 wt % of a rare earth element.

45. The welding consumable composition of claim 44, wherein the rare earth element includes cerium, lanthanum, or yttrium.

46. A welding consumable comprising:
an alloy producing a weldment having a yield strength greater than or equal to 100 ksi and having:
about 7.25 wt % to about 11.5 wt % nickel;
about 0.01 wt % to about 0.05 wt % zirconium;
about 0.3 wt % to about 1.4 wt % manganese;
about 7.25 wt % to about 11.5 wt % nickel;
about 0.8 wt % to about 0.9 wt % molybdenum;
about 0.2 wt % to about 0.7 wt % silicon;
up to about 0.13 wt % carbon;
up to about 0.3 wt % vanadium;
up to about 0.05 wt % titanium;
up to about 2.0 wt % chromium; and
a balance of iron and incidental impurities.

47. The welding consumable of claim 46, wherein the yield strength is greater than or equal to 120 ksi.

48. The welding consumable of claim 47, wherein the yield strength is greater than or equal to 130 ksi.

49. The welding consumable of claim 48, wherein the yield strength is greater than or equal to 140 ksi.

50. The welding consumable of claim 49, wherein the yield strength is greater than or equal to 150 ksi.

51. The welding consumable of claim 50, wherein the alloy has a Charpy V-notch impact energy at −60° F. greater than or equal to 20 ft-lbs.

52. The welding consumable of claim 51, wherein the Charpy V-notch impact energy at −60° F. greater than or equal to 30 ft-lbs.

53. The welding consumable of claim 52, wherein the Charpy V-notch impact energy at −60° F. greater than or equal to 40 ft-lbs.

54. The welding consumable of claim 53, wherein the carbon content is about 0.02 to about 0.06 wt %.

55. The welding consumable of claim 53, wherein the manganese content is about 0.6 to about 0.8 wt %.

56. The welding consumable of claim 53, wherein the nickel content is about 9.0 to about 10.0 wt %.

57. The welding consumable of claim 46, further comprising about 0 to about 0.030 wt % phosphorus plus sulfur.

58. The welding consumable of claim 46, further comprising about 0.0 to about 0.5 wt % of a rare earth element.

59. The welding consumable of claim 58, wherein the rare earth element includes cerium, lanthanum, or yttrium.

60. A welding consumable comprising:
an alloy having about 7.25 wt % to about 11.5 wt % nickel, and
up to about 0.5 wt % of a rare earth element, producing a weldment having a yield strength greater than or equal to 100 ksi.

61. A welding consumable composition comprising:
up to about 0.13 wt % carbon,
about 0.3 wt % to about 1.4 wt % manganese,
about 7.25 wt % to about 11.5 wt % nickel,
about 0.6 wt % to about 1.2 wt % molybdenum,
about 0.2 wt % to about 0.7 wt % silicon,
up to about 0.3 wt % vanadium,
up to about 0.05 wt % titanium,
up to about 0.08 wt % zirconium,
up to about 2.0 wt % chromium,
about 0.0 to about 0.5 wt % of a rare earth element, and
a balance of iron and incidental impurities.

* * * * *